Figure 1:
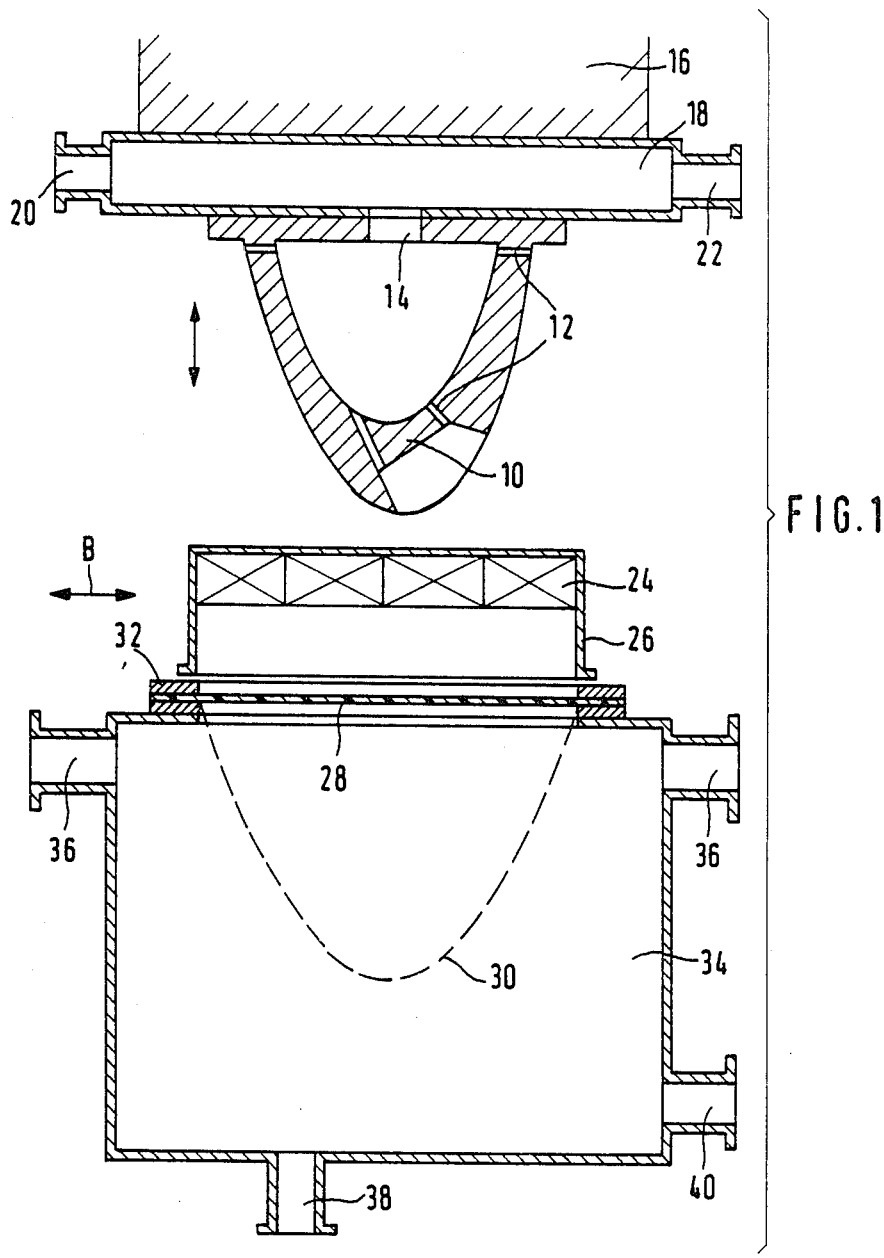

United States Patent [19]
Mente

[11] Patent Number: 4,778,375
[45] Date of Patent: Oct. 18, 1988

[54] TENSION FRAME FOR RELEASABLE CLAMPING OF A FILM

[75] Inventor: Kurt Mente, Hanover, Fed. Rep. of Germany

[73] Assignee: J. H. Benecke AG, Hanover, Fed. Rep. of Germany

[21] Appl. No.: 65,526

[22] Filed: Jun. 23, 1987

[30] Foreign Application Priority Data

Jun. 23, 1986 [DE] Fed. Rep. of Germany ....... 3620954

[51] Int. Cl.⁴ .................. B29C 51/20; B29C 55/20
[52] U.S. Cl. .................................. 425/388; 264/553; 269/170; 269/171; 269/237; 425/DIG. 48
[58] Field of Search .................. 26/71, 72, 89, 91, 94; 264/290.2, 292, 553; 269/121, 142, 162, 170, 171, 237; 425/66, 143, DIG. 48, DIG. 53, DIG. 201, 388

[56] References Cited

U.S. PATENT DOCUMENTS

| | | | |
|---|---|---|---|
| 3,416,194 | 12/1968 | Miller | 425/DIG. 48 |
| 3,600,746 | 8/1971 | Kostur et al. | 425/66 |
| 4,018,551 | 4/1977 | Shuman | 425/DIG. 48 |
| 4,097,035 | 6/1978 | Shuman | 425/DIG. 48 |
| 4,170,449 | 10/1979 | Shuman | 425/DIG. 48 |
| 4,438,054 | 3/1984 | Holden | 425/143 |

*Primary Examiner*—Jay H. Woo
*Assistant Examiner*—C. Scott Bushey
*Attorney, Agent, or Firm*—Cushman, Darby & Cushman

[57] ABSTRACT

In the production of shaped plastic elements using deep-drawable thermoplastic film, a tension frame is required to clamp the film. The tension frame is formed by lengthwise and transverse frame parts, on the outside edges of which is located one angle clamp on each. The angle clamps can be actuated by means of closure levers into a releasable clamping position, in which the clamp arms of the angle clamp press with force against bottom fixing members of the frame parts.

21 Claims, 7 Drawing Sheets

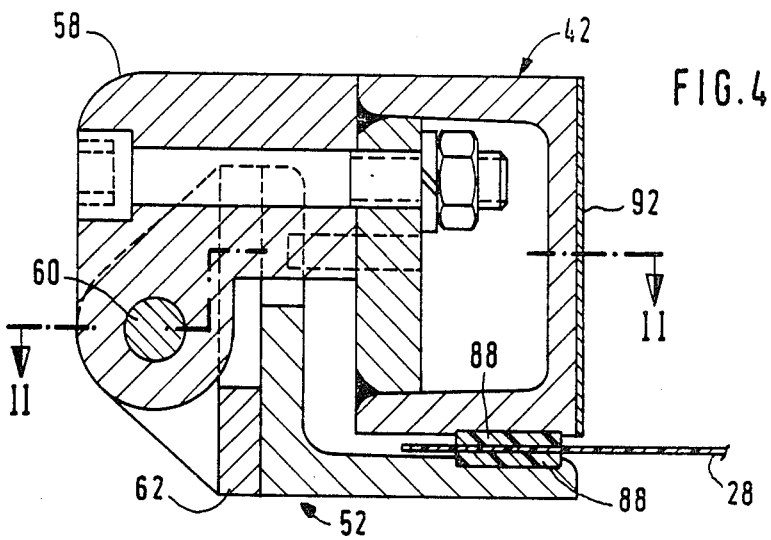
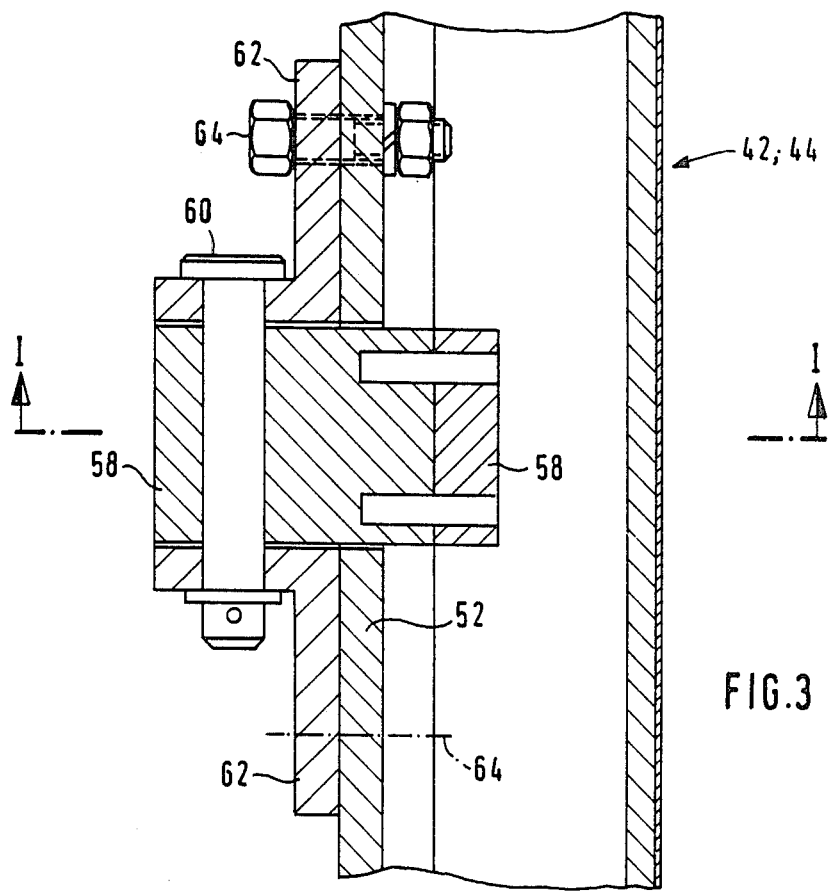

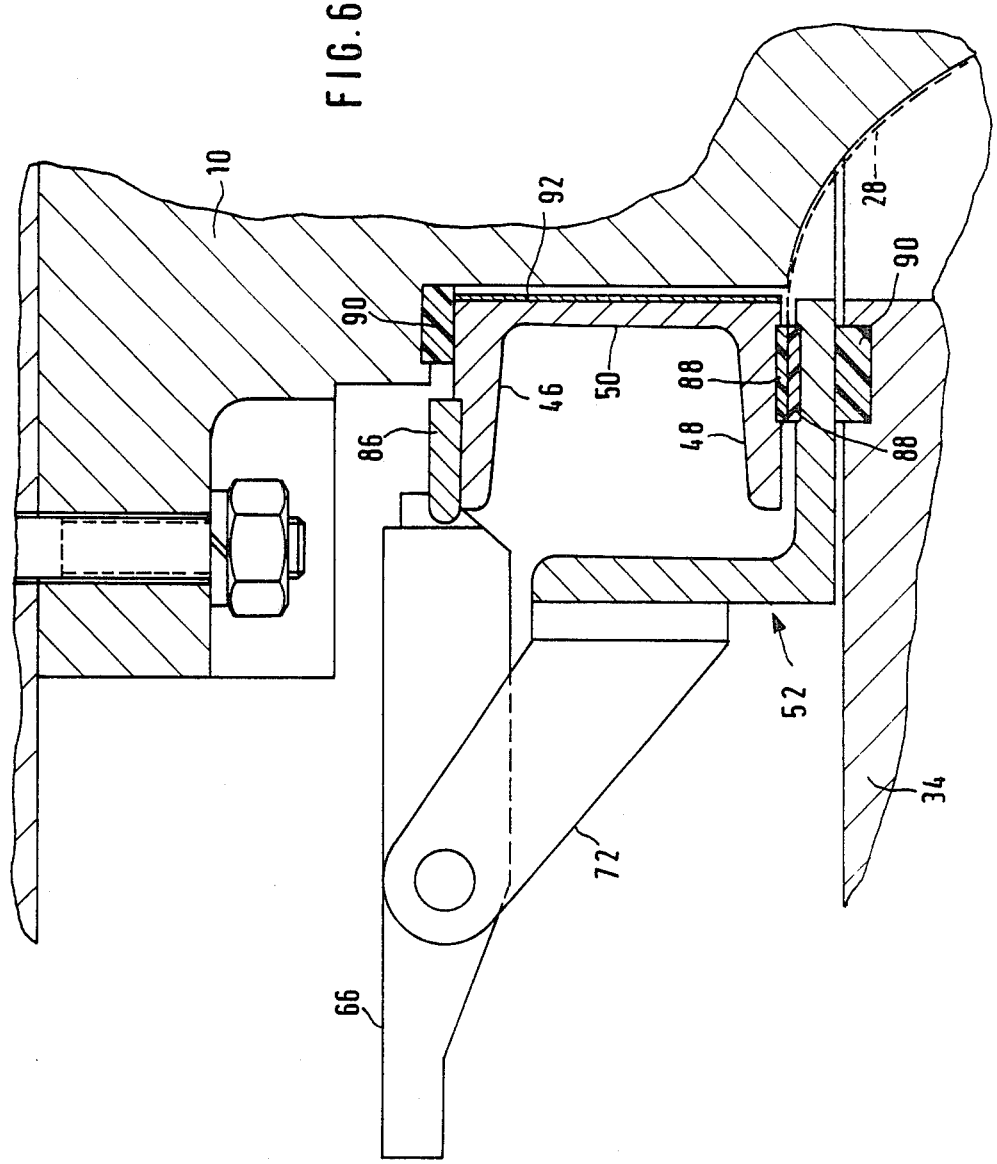

TENSION FRAME FOR RELEASABLE CLAMPING OF A FILM

The invention relates to a tension frame for the releasable clamping of a film as disclosed in the disclosure part of claim 1, especially tension frames for implementation of the process of German Patent Application No. P 35 05 828.5.

Tension frames of this sort are required for the deformation of thermoplastic films, in order to hold the film tightly at the edges during the treatment process. Known processes for vacuum deformation of thermoplastic films are already described in detail in "Modern Plastics Encyclopedia", 1969-1970, pages 534-563 and in DE-OS No. 3 130 584.

As has been shown in practice, one notable drawback of the known process for vacuum deformation of thermoplastic films resides in that during actual use the properties which are required cannot always be produced with the low deformation temperatures which are used.

One decisive improvement is disclosed in the process of the German Patent Application No. 35 05 828.5, in which the film held by a tension frame is heated to the heat molding temperature of the plastic, for the production of a shaped plastic element, especially an expandable truck interior paneling made of a deep-drawable thermoplastic film, and is made arcuate by preforming corresponding to the general shape of a shaping tool, whereupon the film is subjected to final deformation after introduction of the shaping tool into the arc by placing the reverse side of the film on the surface of the shaping tool using a pressure differential and is removed therefrom after cooling.

The decisive advantage of this process resides in that for the final deformation a thick area of the film is heated on its reverse side by means of high radiation intensity in the plastic temperature range of the plastic. A certain portion of the film is then deformed in the temperature range in which the plastic does not return to its original shape. Therefore the employment of for instance instrument panels of a power vehicle is possible even under extreme climatic conditions.

The tension frame plays an important role in all processes for the deformation of thermoplastic films, in which it is to clamp the film at the edges and thus to facilitate the desired deformation. A rigid frame construction under great stress forces is required so as to avoid tearing of the film while it is under stress. This leads to costly frame structures. Great stress force conditions (identical to or greater than 20 kp/m lengths between clamps) are particularly to be dealt with during use of the aforementioned advantageous process according to German Patent Application No. P 35 05 828.5.

Basically of course the production of a rigid frame construction for great stresses raises no particular difficulties, disregarding the outlay and costs. However there is still another important aspect. The frame construction which is employed at this time requires a relatively sizable floor space. In practice, in devices for implementation of the process for the deformation of films, cramped worksite dimensions are present between the shaping tool and the molding box or suction box. With the advantageous process cited above the film held by the tension frame is laid out on these molding boxes, in order then to execute the desired deformation.

The limited floor space dimensions complicate a rigid frame construction for high stresses, since only a small space is available for any locking or clamping members.

Furthermore it must be considered that pieces of film of different dimensions can be used as desired for the production of shaped plastic elements. Therefore different tension frames with different frame contact surfaces must also be available. Since one single tension frame for each piece of film is already very costly on account of the different requirements and conditions, the provision of a plurality of tension frames represents a further drawback in terms both of storage and of cost. It is also to be considered that the changing of the tension frame is connected with not inconsiderable work outlay and causes down time.

The object of the invention is to provide a tension frame which as a result of simple construction has a easily operable locking mechanism for clamping the film when great stress forces are present, and actually while using only a limited space, and which with simple means facilitates the clamping of films of different sizes.

The invention attains this goal with the tension frame disclosed in the disclosure part of claim 1, characterized in that a mounting base composed of frame parts is provided with a bottom fixing member, that a pivotal clamp element with a clamp arm is arranged extending over the length of the relevant frame part on the outside of each frame, and that the clamp arms can be moved by means of associated closure levers into a releasable clamp setting, in which the clamp arms press with force against the fixing member of the frame parts.

The described features of the new tension frame facilitate the provision of two lengthwise frame parts and two transverse frame parts for each, which together define the frame surface, and both transverse frame parts are releasably mounted between the lengthwise frame parts. The advantage is thus obtained of having a variability in the size of the tension frame to enable grasping of different shaped of films.

A desired change of shape requires only the shifting of the transverse frame parts and with that a change of the relevant spacing of the facing transverse frame parts, if a different length is desired with the same width of the film section. In case a different width of the film is also required, the releasable transverse frame parts can be replaced by suitable larger or smaller transverse frame parts. Different film sections then do not require the use of different and separate tension frames. This is an important advantage provided by the invention, since the tension frame can be suitably readjusted or changed over for different shaped with few hand grips.

The pivotal clamp arm arranged on the outside of each frame part and extending over the length of the frame part allows the possibility of clamping the film with simple means such as closure levers. This construction advantageously facilitates the arrangement of the closure lever horizontally to the frame plane and outside the frame, so as to tolerate the conditions of cramped space. Also the horizontal arrangement of the closure lever can be effected in a simple manner from above by use of a compressed air cylinder, in order either to hold or to release the clamp setting.

The effect of the compressed air cylinder applied from above has the advantage that it does not prevent horizontal movement of the tension frame after operation of the closure lever, in other words, the tension frame can immediately be moved to the side. This condition has an especially favorable effect on automation of the entire process for the production of the shaped plastic elements which is generally sought, and the tension frame is moved by means of a conveyor system from the deformation setting over the aforementioned molding box sideways into the mold opening site (and vice versa).

In another configuration of the invention the frame parts are configured as steel frame parts which are U-shaped and the bottom horizontal arm of the "U" forms the fixing member. Furthermore the clamp element is formed by an angle clamp of which the bottom is the clamp arm. This structure in connection with the closure lever allows production of the desired stress forces without any further adjustment, even despite the aforementioned cramped floor space between the shaping tool and the molding box.

According to another advantageous further development of the invention the tension frame has an inside lining with highly polished aluminum sheets. These cause a reflection of the outward-directed infrared radiation of the heating element provided for heating the film into the marginal areas. This means that the marginal areas of the film as well as the middle of the film are heated uniformly.

Another advantageous feature of the invention resides in that both the clamp arm and the fixing member and also the top arm of the base mount have joint faces. In working position the tension frame can therefore also function as a packing element between the shaping tool and the molding box, so that it is possible to perform the deformation in a vacuum.

Other appropriate configurations of the invention are provided in the dependent claims and are to be assumed from the drawing.

Figure 2:
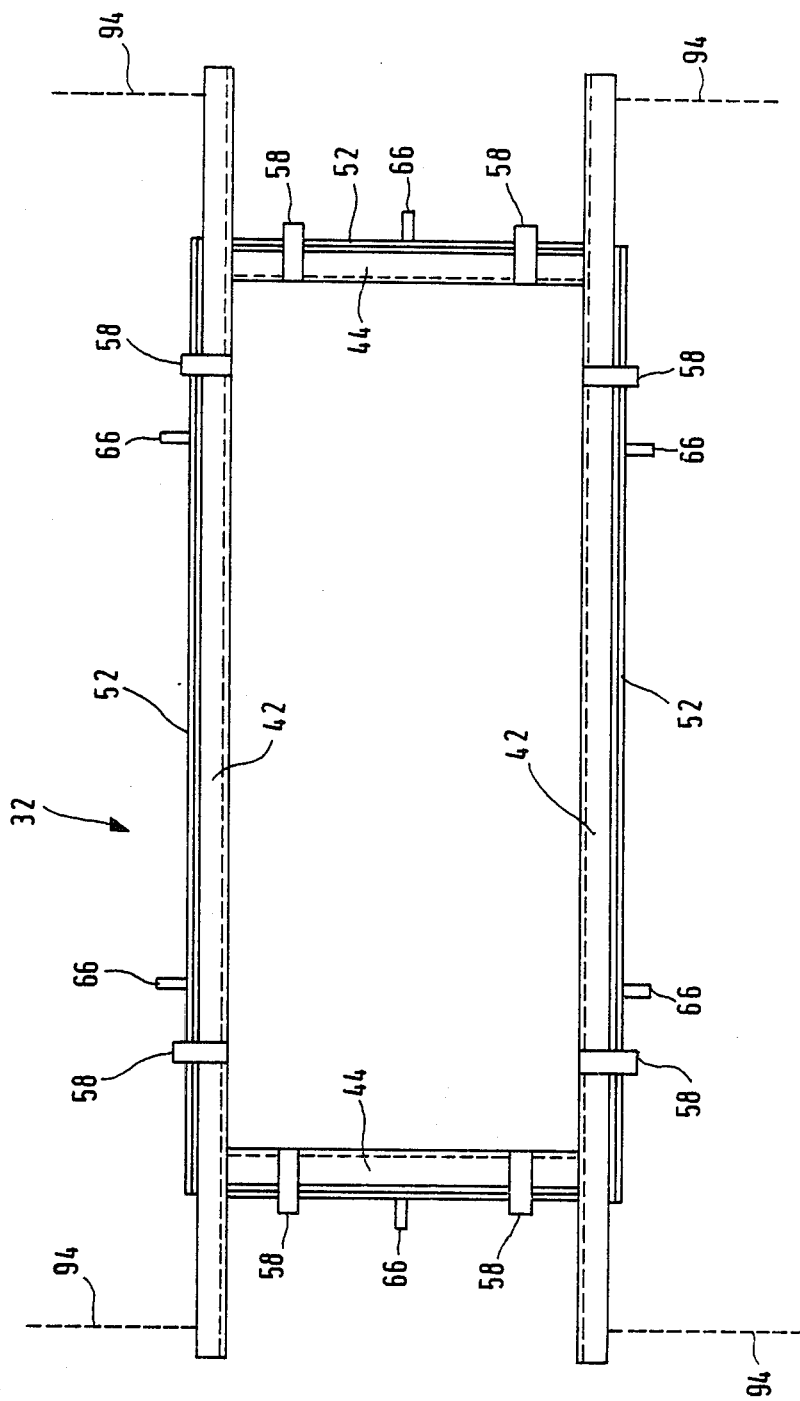
Figure 5:
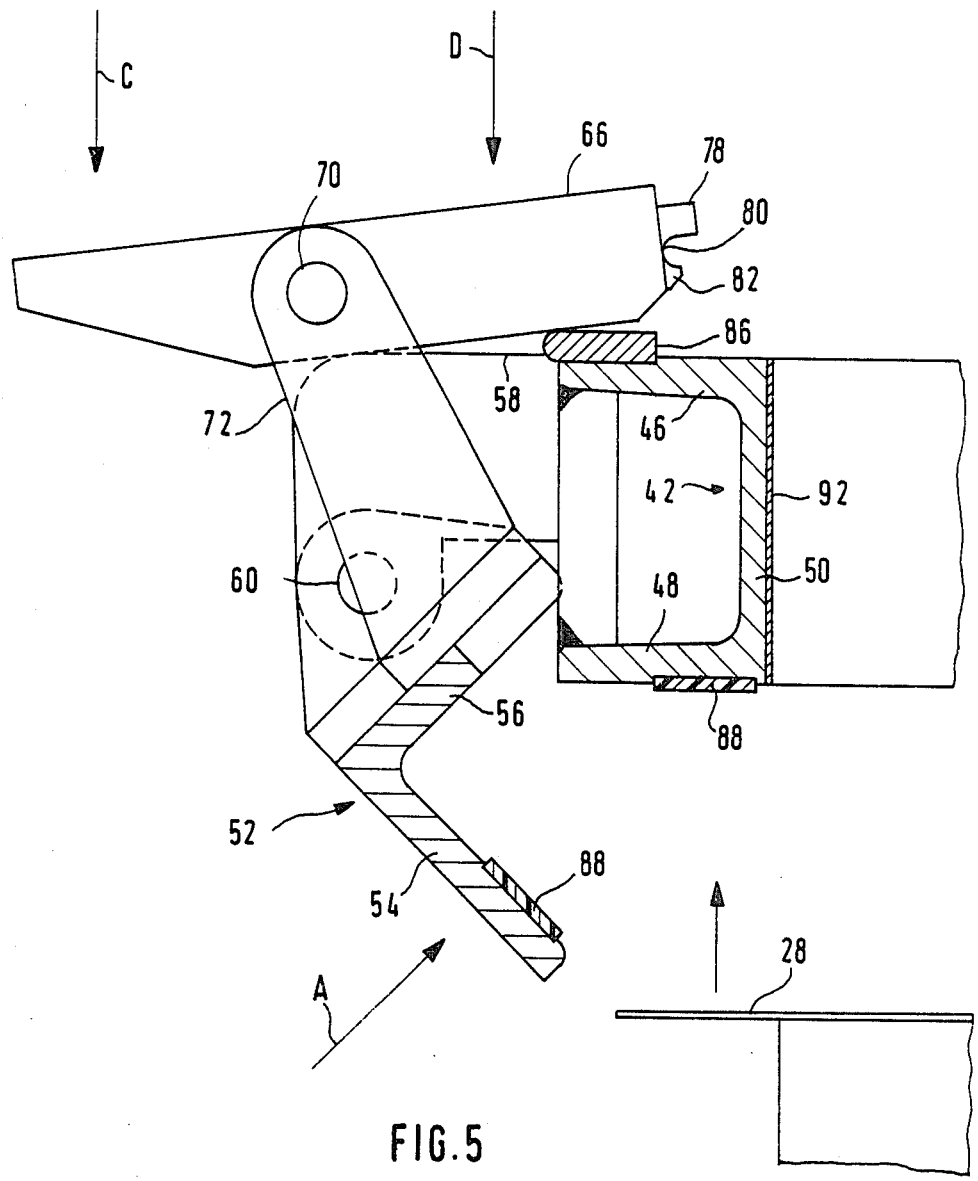
Figure 8:
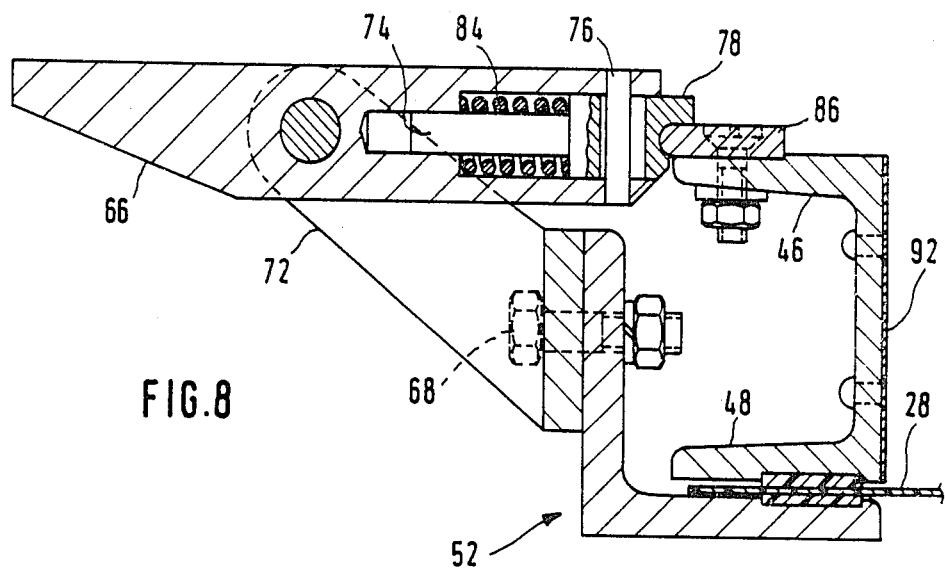
Figure 7:
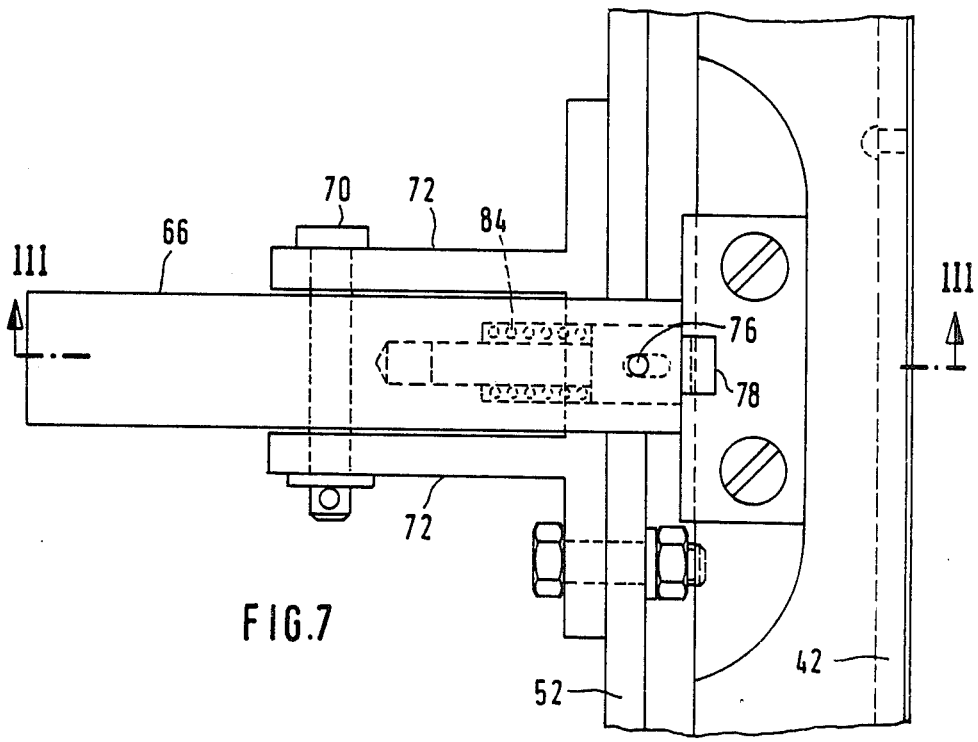
Figure 9:
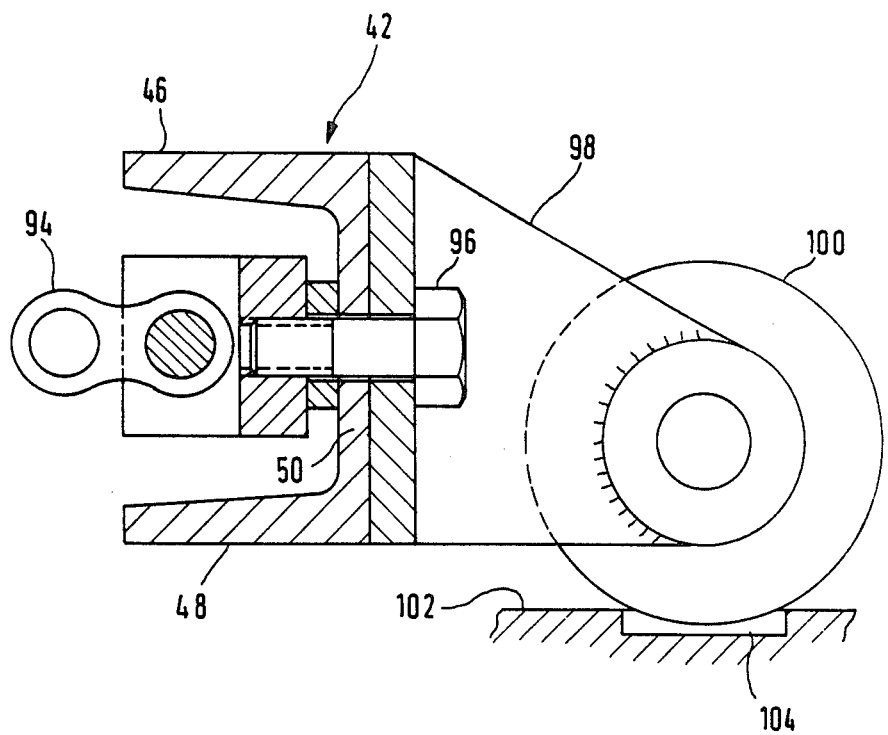

The invention is explained in more detail hereinafter for improved understanding of the exemplary embodiment which is shown in the drawing. The drawings show:

FIG. 1, a diagrammatic transverse section of a device for the production of a shaped plastic element to illustrate the use of a tension frame, FIG. 2, a plan view of a tension frame, FIG. 3, a cross section (plan view) of a mounting for attachment of a clamp element to a frame part (line II—II of FIG. 4), FIG. 4, a transverse section of the mounting along line I—I, FIG. 5, a side view of a closure lever for the clamp element in open position, FIG. 6, a side view of FIG. 5, but with the clamp element in closed position, FIG. 7, a plan view of the closure lever of FIG. 6, FIG. 8, a transverse section along the line III—III of FIG. 7, and FIG. 9, a transverse view of a chain conveyor for the tension frame, with guide rails and rollers.

For the general explanation of the use of a tension frame the production of a shaped plastic element will be explained in some detail relative to the device shown diagrammatically in FIG. 1. The device includes a shaping tool 10 with a plurality of suction openings 12 and 14. Shaping tool 10 is mounted on a tool holder 16, which can be moved vertically over a crank drive which is not shown in detail.

Tool holder 16 which holds shaping tool 10 is configured as a reinforced box girder, of which the hollow space 18 can be connected through a connection 20 and through a flexible line to a vacuum unit which is not shown. Hollow space 18 also opens into another connection 22 with a not shown solenoid valve, which allows for pressure compensation with the air pressure of the environment following the deformation process.

Beneath shaping tool 10 is arranged an infrared radiator 24 with a side shield 26 to serve as heat source. Double arrow B indicates that infrared radiator 24 can be moved horizontally.

One essential component in FIG. 1 is the tension frame 32, in which a film 28 is held by clamping on all sides. Tension frame 32 is located in its position shown in FIG. 1 over a molding box (suction box) 34 which is open on top, and tension frame 32 can likewise be moved side to side and horizontally.

The molding box which is open on the top has connections 36 and 38 for application of the thrust air and also another connection 40, through which a vacuum can be produced within molding box 34.

Infrared radiator 24 is inserted from the side into the position shown in the device in order to heat film 28 which is clamped in tension frame 32. Thrust air is simultaneously blown through connections 36 into molding box 34, and the thrust air can flow out through opening 38 into the environment. The velocity of the air being discharged is thus a measure of the pressure level being produced in molding box 34, which supports film 28 during the heating up process.

Film 28 is clamped within tension frame 32 so that the patterned side is turned away from the infrared radiator 24. Thus the reverse side of the film is heated by infrared radiator 24. When the desired deformation temperature has been reached connections 36 and 38 are closed by valves which are not shown in the drawing, and vacuum is applied simultaneously to connection 40. As a result, film 28 is pre-deformed and takes approximately the position shown by a broken line with reference number 30.

Only at this time is infrared radiator 24 moved to the side into a hold position outside the deep-drawing device, and tool holder 16 with shaping tool 10 is introduced obliquely into molding box 34. At this moment a high vacuum is applied to shaping tool 10 through connection 20, and the other connection 22 remains closed.

Connection 40 is also closed simultaneously and connection 38 is opened, so that the air pressure of the surrounding air is adjusted in molding box 34, which presses film 28 precisely to the outline of shaping tool 10.

After a cooling time of approximately 30 seconds connections 20 is closed and connection 22 is opened, so that the surrounding air pressure is reset in shaping tool 10. Now shaping tool 10 is again moved up into the position shown in FIG. 1 over molding box 34. Tension frame 32 is likewise moved to the side to a site for removal from the mold, and now the completely shaped deep-drawn film can be completely removed from tension frame 32.

The details of construction of the tension frame which is shown only diagrammatically in FIG. 1 are shown in FIGS. 2-8. The plan view of FIG. 2 shows that tension frame 32 consists of two lengthwise frame parts 42, between which extend two transverse frame parts 44. A pivotal and angular clamp element 52 with a bottom arm forming a clamp arm 54 and a top portion 56 (see FIG. 5) extends on the outside of each lengthwise frame part 42 and transverse frame part 44. As is clear from FIG. 6, the lengthwise and transverse frame parts are configured as U-shaped in profile with a top arm 46, a bottom arm 48 serving as fixing members as well as a perpendicular arm 50.

Angle clamps 52 are mounted or suspended by means of mountings 58 which are configured as types of rocker bearings on lengthwise frame parts 42 and/or transverse frame parts 44. Each mounting 58 as shown in FIGS. 3 and 4 includes an axis 60 supported by angle members 62, to which angle clamp 52 is pivotally suspended. Angle members 62 are fastened by means of screw connections 64.

Closure levers 66, of which the structure is shown in FIGS. 5-8, are also provided on lengthwise frame parts 42 and transverse frame parts 44 of tension frame 32 at some distance from mountings 58. Closure lever 66 is arranged to be pivotally mounted around a bolt 70 between two support arms 72, which are connected with clamp arms 52 and support bolts 70.

Supports arms 72 supporting both closure levers 66 over bolts 70 on top arm 56 of angle clamp 52 are attached by means of screw connections 68. The plan view of FIG. 2 shows that two closure levers 66 are provided in lengthwise frame parts 52, while only one closure lever is provided in the case of the shorter transverse frame parts 44.

FIG. 5 shows angle clamp 52 in open setting, while FIGS. 6-8 show angle clamp 52 in closed clamping setting. Proceeding from FIG. 5, film 28 is brought up into contact with a joint face 88 on bottom arm 48 (fixing profile). Another joint face 88 is found on the inside of bottom arm 54.

After film 28 engages on top joint face 88, the four angle clamps 52 are pressed by not shown compressed air cylinders on lengthwise frame parts 42 and/or transverse frame parts 44, in order to close tension frame 32. The effect of the compressed air cylinder is indicated by arrow A in FIG. 5.

After acting on bottom clamp arm 54 in the direction of arrow A and as a result of a movement to the left in FIG. 5, the closure lever 66 which is connected with angle clamp 52 takes a position in which it engages with its bevel 82 at its front end on the front of a tempered catch ledge 86, which is arranged on top arms 46 of lengthwise frame parts 42 and transverse frame parts 44.

After reaching this setting each closure lever 66 is now pressed downward by other not shown compressed air cylinders in the direction of arrow D, so that closure levers 66 engage and lock, and film 28 is clamped accurately for its particular size and tightly in tension frame 32. The two-step closing process is ended. The selected compressed air cylinders are carried back into their original position, and tension frame 32 is moved into work position by a chain conveyor (see FIG. 1) with guide rollers. Before shaping tool 10 is moved thereover, first film 28 is heated by means of infrared radiator 24 over molding box 34.

The highly polished aluminum sheets 92 mounted on perpendicular arms 50 on the inside of tension frame 32 are provided to prevent marginal radiation, so that the marginal areas of film 28 are heated uniformly as well as the middle of the film.

The engagement of closure lever 66 causing the final closing of angle clamp 52 is facilitated by a cotter pin 74 located within closure lever 66, of which the heat 78 is provided with a recess 80 adapted to the shape of the edge of catch ledge 86. With the engagement, cotter pin 74 is pressed counter to the force of a spring 84 which is likewise located within closure lever 66, which presses cotter pin 74 with heat 78 against catch ledge 86 and thus secures the closed setting of closure lever 66. The horizontal movement of cotter pin 74 is limited by a pin 76 which is guided in a lengthwise aperture.

After the tension frame 32 which is thus closed is moved with film 28 into the aforementioned work position, and after film 28 has been heated by infrared radiator 24, vacuum is applied to molding box 34 for the preforming. Then shaping tool 10 is moved into molding box 34. At this instant vacuum is applied to the shaping tool for the final deformation and a high pressure is produced in molding box 34. Tension frame 32 then works for all practical purposes as a packing element between shaping tool 10 and molding box 34. Foam rubber packings 90 as shown in FIG. 6 are provided to produce an especially tight closing.

After the final deformation shaping tool 10 is again moved upward, and tension frame 32 is moved to the side into the site for removal from the mold, after molding box 34 has been opened. Tension frame 32 is reopened in the site for removal from the mold.

Closure lever 66 of FIG. 5 is pressed downward at the outside end by compressed air to open tension frame 32, which is indicated by arrow C. The catch connection between head 78 and catch ledge 86 is thus released, so that angle clamps 55 are opened and thus take the position shown in FIG. 5. The part of the mold drops downward and can then be reprocessed.

The new tension frame 32 can be adapted or changed over in a simple manner for pieces of film of different shapes. But when sections of film are identical width with different lengths only transverse frame parts 44 need by shifted to the front in a suitable manner. If on the other hand the width of the section changes, the transverse frame parts (with suitable angle clamps) are to be replaced by others.

Tension frame 32 with bottom clamp arms 54 advantageously allows the possibility of cooling the heat sensitive patterned side of film 28, lying downward, to be cooled by the thrust or support air. The film section on account of the U-shaped profile of the tension frame and on account of the bottom clamp arm 54 lies quite low in the frame, so that the cooling can be effected uniformly over the surface. Dead zones are thus avoided.

A conveyor system for moving tension frame 32 is shown in FIG. 9, provided with a chain conveyor 94 (the separate individual conveyor chains are already shown in FIG. 2, where it is clear that chain conveyors 94 engage outside the actual tension frame 32 on the ends of lengthwise frame parts 42).

Chain conveyors 94 are mounted on lengthwise frame parts 42 by screw connections 96, and frame parts 42 are also connected through angles 98 with guide rollers 100.

Guide rails 102 are provided for the shifting of tension frame 32 with the use of conveyor chains 94, and guide rollers 100 which slide on rails 102. When the deformation position is reached, the guide rollers go into indentations 104 provided at suitable points in guide rails 102, so that tension frame 32 is lowered and the joint faces come essentially automatically into position because of the specific weight of tension frame 32.

What is claimed:

1. Tension frame for releasably clamping a film during production of a shaped plastic article from a deep-drawable thermoplastic film, in which the film held by the tension frame is heated, then shaped and following a cooling is removed from the tension frame, wherein:

a mounting base, composed of frame means, is provided with a bottom fixing member, a pivotal clamping element is arranged on an outside surface of said frame means extending with clamp means over the length of the associated frame means, and said clamp means are mounted to be movable into a releasable clamping position by means of associated closure levers and in which the clamp means is movable against said bottom fixing member of said frame means, said clamp means being formed by an angle clamp with two arms angularly arranged with respect to each other, of which a bottom arm forms a clamping arm, each clamp means having at least one closure lever mounted pivotally above the clamp means for holding the clamp means in its clamping position which is substantially parallel to a plane containing said tension frame.

2. Tension frame as in claim 1, wherein the frame means of the mounting base are U-shaped steel frame parts and that one of the parts comprises the fixing member.

3. Tension frame as in claim 1 wherein said frame means includes two lengthwise frame parts and two transverse frame parts which form a rectangle and that the transverse frame parts are fastened releasably between the lengthwise frame parts so that the distance between the transverse frame parts can be changed.

4. Tension frame as in claim 1 wherein the clamp means are fastened to the frame means by means of a mounting element and that said mounting element has an axis on which the clamp means are pivotally suspended.

5. Tension frame as in claim 4, wherein said axis is arranged at a distance from the frame means so that the clamp means assume a rest position as a result of the force of gravity, in which the fixing member of said mounting base and the clamp means are located at a distance from each other.

6. Tension frame as in claim 1 wherein said closure lever has a cotter pin on its front end which faces one of said frame means said pin having a head which includes a recess.

7. Tension frame as in claim 6, wherein the cotter pin is movably mounted with the exception of its head within the closure lever and remains under the effect of the bias of a spring which counters movement of the cotter pin into said closure lever.

8. Tension frame as in claim 7, wherein a tempered catch ledge is provided on said frame means extending out over an end of one of said arms which is engageable with the recess of the cotter pin.

9. Tension frame as in claim 1, wherein the clamp means of the frame means and the associated bottom fixing member are provided with joint faces on their adjacent sides.

10. Tension frame as in claim 8, wherein a packing is provided on the outside of the frame means on a side opposite the catch ledge.

11. Tension frame as in claim 2, wherein the U-shaped mounting base has a perpendicular arm which has a highly polished aluminum sheet on an inside face thereof.

12. Tension frame as in claim 1, wherein outside ends of the frame parts forming the frame lengthwise sides have means connectable with a conveyor system for movement of the tension frame.

13. Tension frame as in claim 12, wherein, the tension frame includes guide rollers and is movable by said conveyor system on guide rails with said guide rollers and that indentations are provided in the guide rails in which the guide rollers engage for deformation setting, and wherein the tension frame is lowered.

14. Tension frame as in claim 9, wherein the tension frame includes guide rollers and is movable by a conveyor system on guide rails with said guide rollers and that indentations are provided in the guide rails in which the guide rollers engage for deformation setting and the tension frame is lowered and the joint faces come into position.

15. Tension frame for releasably clamping a film during production of a shaped plastic article from a deep-drawable thermoplastic film, in which the film held by the tension frame is heated, then shaped and following a cooling is removed from the tension frame, wherein:

a mounting base, composed of frame means, is provided with a bottom fixing member, a pivotal clamping element is arranged on the outside of said frame means extending with clamp means over the length of the associated frame means, and said clamp means are mounted to be movable into a releasable clamping position by means of associated closure levers and in which the clamp means is movable against said bottom fixing member of said frame means, said clamp means of said frame means and the associated bottom fixing member having joint faces on adjacent sides, said tension frame including guide rollers movable by a conveying system on guide rails, said guide rails including indentations thereon in which said guide rollers engage for deformation setting and said joint faces come into position.

16. Tension frame as in claim 15 wherein the clamp means are formed by an angle clamp with two arms arranged perpendicular to each other, of which a bottom arm forms a clamp arm.

17. Tension frame as in claim 16, wherein each clamp means has at least one closure lever mounted pivotally above the clamp means for holding the clamp means in its clamping position.

18. Tension frame as in claim 16, wherein a lever bracket is fastened on an upper one of the arms of the angle clamp and a bolt is arranged on its end opposite the angle clamp, which supports the closure lever.

19. Tension frame as in claim 18, wherein the lever bracket includes two supporting arms extending parallel to and at a spacing from each other, between which extends the closure lever.

20. Tension frame as in claim 17, wherein said tension frame extends in a plane and the closure lever extends in a clamp setting position horizontally parallel to the plane of the tension frame.

21. Tension frame for releasably clamping a film during production of a shaped plastic article from a deep-drawable thermoplastic film, in which the film held by the tension frame is heated, then shaped and following a cooling is removed from the tension frame, wherein:

a mounting base, composed of frame means, is provided with a bottom fixing member, a pivotal clamping element is arranged on an outside surface of said frame means extending with clamp means over the length of the associated frame means, and said clamp means are mounted to be movable into a releasable clamping position by means of associated closure levers and in which the clamp means is movable against said bottom fixing member of said frame means, outside ends of frame members forming the frame means lengthwise side have means connectable with a conveyor system for movement of said tension frame, said tension frame including guide rollers moveable by said conveyor system on guide rails, said guide rails, having indentations provided therein in which said guides rollers engages for deformation setting, and wherein said tension frame is lowered.

* * * * *